United States Patent [19]

Grice et al.

[11] Patent Number: 5,600,822
[45] Date of Patent: Feb. 4, 1997

[54] RESOURCE ALLOCATION SYNCHRONIZATION IN A PARALLEL PROCESSING SYSTEM

[75] Inventors: Donald G. Grice, Kingston; Peter H. Hochschild, New York, both of N.Y.

[73] Assignee: International Business Machines Corporation, Armonk, N.Y.

[21] Appl. No.: 223,272

[22] Filed: Apr. 5, 1994

[51] Int. Cl.$^6$ .............................. G06F 9/46; G06F 13/18
[52] U.S. Cl. ...................... 395/500; 395/674; 364/230.1; 364/281.6
[58] Field of Search ..................... 395/500, 575, 395/565, 325, 725, 650, 732, 375; 364/230.1, 281.3, 281.4, 281.8, 281.6

[56] References Cited

U.S. PATENT DOCUMENTS

| | | | |
|---|---|---|---|
| 4,257,095 | 3/1981 | Nadir | 364/200 |
| 4,320,467 | 3/1982 | Glass | 364/900 |
| 4,449,183 | 5/1984 | Flahive et al. | 364/200 |
| 4,481,583 | 11/1984 | Mueller | 395/732 |
| 4,590,555 | 5/1986 | Bourrez | 365/650 |
| 4,727,487 | 2/1988 | Masui et al. | 364/274.3 |
| 4,796,178 | 1/1989 | Jennings et al. | 395/650 |
| 4,914,657 | 4/1990 | Walter et al. | 371/11.3 |
| 5,036,453 | 7/1991 | Renner et al. | 364/200 |
| 5,050,072 | 9/1991 | Chastain et al. | 395/375 |
| 5,072,363 | 12/1991 | Gallagher | 395/725 |
| 5,088,024 | 2/1992 | Vernon et al. | 395/725 |
| 5,129,077 | 7/1992 | Hillis | 395/500 |
| 5,146,585 | 9/1992 | Smith, III | 395/550 |
| 5,163,149 | 11/1992 | Brantley, Jr. et al. | 395/650 |
| 5,179,702 | 1/1993 | Spix et al. | 395/650 |
| 5,192,882 | 3/1993 | Lipovski | 307/471 |
| 5,228,138 | 7/1993 | Pratt et al. | 395/550 |
| 5,333,319 | 7/1994 | Silen | 395/650 |
| 5,386,561 | 1/1995 | Huynh et al. | 395/650 |
| 5,448,732 | 9/1995 | Matsumoto | 395/650 |

OTHER PUBLICATIONS

"IBM International Technical Support Centers AIX Version 3.1 RISC System/6000 As A Real-Time System," Document No. GG24-3633-00; First Edition (Mar. 1991), International Technical Support Center, Austin, Texas.

Primary Examiner—Kevin J. Teska
Assistant Examiner—Tan Q. Nguyen
Attorney, Agent, or Firm—Floyd A. Gonzalez; Heslin & Rothenberg

[57] ABSTRACT

A method and system for synchronizing allocation of resources in a parallel processing system. At predefined time intervals, each user application executing in a parallel processing system is given a higher priority such that the system resources are allocated to the user applications instead of the operating system services. This high priority lasts for a predetermined amount of time. When the time has elapsed, each priority value is lowered, thus giving the operating system services an opportunity to execute.

20 Claims, 2 Drawing Sheets

RESOURCE ALLOCATION SYNCHRONIZATION IN A PARALLEL PROCESSING SYSTEM

TECHNICAL FIELD

This invention relates in general to parallel processing and, in particular, to synchronizing allocation of resources in a parallel processing system such that the availability of user processing cycles is maximized.

BACKGROUND ART

Typical parallel processing systems include a plurality of processors or nodes which are coupled together via a communications switch. One example of a parallel processing system is Scalable Power Parallel Systems 9076-SP1 offered by International Business Machines Corporation. SP1 provides the flexibility of running large parallel jobs, as well as serial jobs, that utilize the processors as if they were standard workstations. To facilitate this diversity and allow the systems to bootstrap on progress made in the workstation area, each processor includes a full operating system environment. In one instance, this environment is UNIX based and is referred to as AIX. AIX uses daemon processes (i.e., subroutines) to provide operating system services for the user, which are scheduled periodically.

On a single processor workstation the effect of scheduling these daemons is the cost of swapping to the daemon process plus the time that the daemon runs. The effect of this workload is, for example, a small (5%) decrease in available user cycles. The effect is linear for the single processor application. That is, an increase in daemon activity results in a direct (linear) decrease in user cycles. The effect on parallel jobs, on the other hand, is very non-linear. This non-linear effect is caused by the fact that the daemons are not synchronized between the processors. Thus, at any given time, on one or more processors, daemon activity is taking place, thereby causing the user applications to sleep. The effect is a degradation in system performance.

One mechanism for synchronizing nodes within a system is described in, for instance, U.S. Pat. No. 4,914,657, entitled "Operations Controller For A Fault Tolerant Multiple Node Processing System," issued on Apr. 3, 1990 and assigned to Allied-Signal, Inc. The synchronizer described in the above-referenced patent establishes and maintains synchronization between all of the operation controllers in the system. The multi-computer architecture uses loose synchronization which is accomplished by synchronous rounds of message transmission by each node in the system. In this method, each synchronizer detects and time stamps each time dependent message received by its own node. These time dependent messages are transmitted by every other node in the system at predetermined intervals and they are received by all the other nodes in the system. As a result of the wrap-around interconnection, a node will receive its own time dependent messages along with the other time dependent messages sent by the other nodes. The time stamps on a nodes own time dependent message is compared with the time stamps on all of the other time dependent messages in order to maintain synchronization among the nodes.

Thus, communication between the nodes is necessary. This communication results in processing overhead and degrades system performance. Therefore, a need still exists for a synchronization technique which does not degrade system performance and does not require explicit communication between the nodes.

SUMMARY OF THE INVENTION

The shortcomings of the prior art are overcome and additional advantages are provided through the provision of a method for synchronizing allocation of resources in a parallel processing system. The parallel processing system has a plurality of processors and one or more of the processors executes one or more user applications. Each of the one or more user applications has a priority value. At predefined time intervals, each priority value is raised for a predetermined amount of time. The raising of each priority value is independently performed by each of the plurality of processors executing a user application. Each user application having a raised priority value is allocated resources. The allocating of resources is synchronized for the user applications executing within the plurality of processors.

In one embodiment, each of the plurality of processors includes a time of day register and the predefined time intervals are determined for each of the plurality of processors by using each of the time of day registers.

In a further embodiment of the invention, a method for synchronizing allocation of resources in a parallel processing system is provided. The parallel processing system has a plurality of processors and one or more of the processors executes one or more user applications. At predefined time intervals, resources are allocated for a predetermined amount of time to one or more user applications. The allocating is performed independently by each of the plurality of processors executing the user applications. Allocating of the resources is synchronized for the user applications executing within the plurality of processors. One or more of the user applications are executed.

In a further aspect of the invention, a system for synchronizing allocation of resources in a parallel processing system is provided. The parallel processing system has a plurality of processors and one or more of the processors executes one or more user applications. Each of the one or more user applications has a priority value. Means are provided for raising at predefined time intervals each priority value for a predetermined amount of time. The raising of the priority values are performed independently by each of the plurality of processors executing a user application. Means are further provided for allocating resources to each user application having a raised priority value. The allocating of resources is synchronized for the user applications executing within the plurality of processors.

In a further aspect of the invention, a system for synchronizing allocation of resources in a parallel processing system having a plurality of processors is provided. One or more of the plurality of processors executes one or more user applications. Means are provided for allocating resources at predefined time intervals for a predetermined amount of time to one or more user applications. Allocating of the resources is performed independently by each of the plurality of processors executing the one or more user applications. Allocating of the resources is synchronized for the user applications executing within the plurality of processors. Means are further provided for executing the one or more user applications.

The resource synchronization technique of the present invention advantageously enables the synchronization of resource allocation without requiring communication between each of the processors. Thus, processing overhead is reduced and system performance is enhanced.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a mechanism for synchronizing resource allocation in a parallel processing system is provided. One example of a parallel processing system is depicted in FIG. 1.

Figure 1:
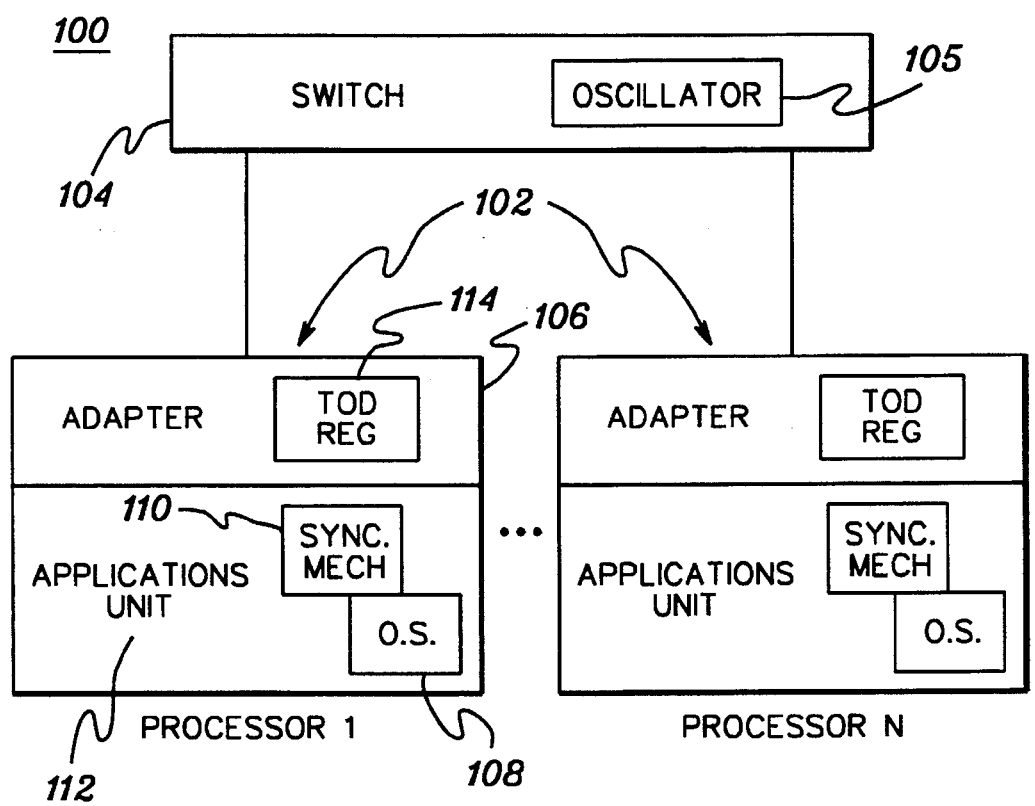
FIG. 1 depicts one example of a parallel processing system incorporating the synchronization mechanism of the present invention.

Referring to FIG. 1, parallel processing system 100 includes a plurality of nodes or processors 102 and a switch 104 for coupling each of the processors. In one example, switch 104 is a known cross-bar switch and includes an oscillator or clock 105. As described further below, the oscillator generates a signal which is passed to each of the processors for updating the time of day data.

In one embodiment, parallel processing system 100 includes 512 processors and each processor is a RISC/6000 offered by International Business Machines Corporation. Each processor includes, for instance, an adapter 106, an operating system 108, a synchronization mechanism 110, and an applications unit 112. Each of these components is described below.

Adapter 106 is a known communications adapter, which is coupled to switch 104 and is used in communicating with the other processors via the switch. Adapter 106 includes a time of day register 114 (TOD REG). Each time of day register initially receives a synchronized time of day value and thereafter receives increment signals from oscillator 105. In accordance with the principles of the present invention, each time of day register contains the same time of day data.

Operating system 108 is, for instance, a UNIX based operating system, referred to as AIX, offered by International Business Machines Corporation. As is known, the operating system controls processing within its processor and includes mechanisms for watching over and cleaning up processor memory. The operating system further includes a mechanism for prioritizing jobs running within the processor. The prioritization scheme sets a priority for those jobs or services initiated by the operating system, as well as for user applications running on the processor. One embodiment of a prioritization scheme is described in detail in AIX Version 3.1 RISC SYSTEM/6000 AS A REAL TIME SYSTEM, IBM Publication No. GG24-3633-00, which is incorporated herein by reference in its entirety.

Synchronization mechanism 110 is an extension to the operating system and includes the technique of the present invention for synchronizing resource allocation within parallel processing system 100. As described further below, synchronization mechanism 110 is used to raise the priority of a user application running on a processor such that the application, and not the operating system services, is allocated the necessary system resources. The system resources include, for instance, the central processing unit, communications adapter, system memory, locking mechanisms and storage devices.

In accordance with the principles of the present invention, all user applications executing in the parallel processing system will have its priority value raised at the same time. Thus, at any given time, the allocation of system resources is synchronized such that all user applications receive the resources at the same time.

In addition to the components described above, applications unit 112 includes a user application program, which is executing in the parallel processing system. In one embodiment, each processor includes a different program. However, in another example, a subset or all of the processors include the same application. It is also possible in further embodiments to have a processor executing more than one user application.

Figure 2:
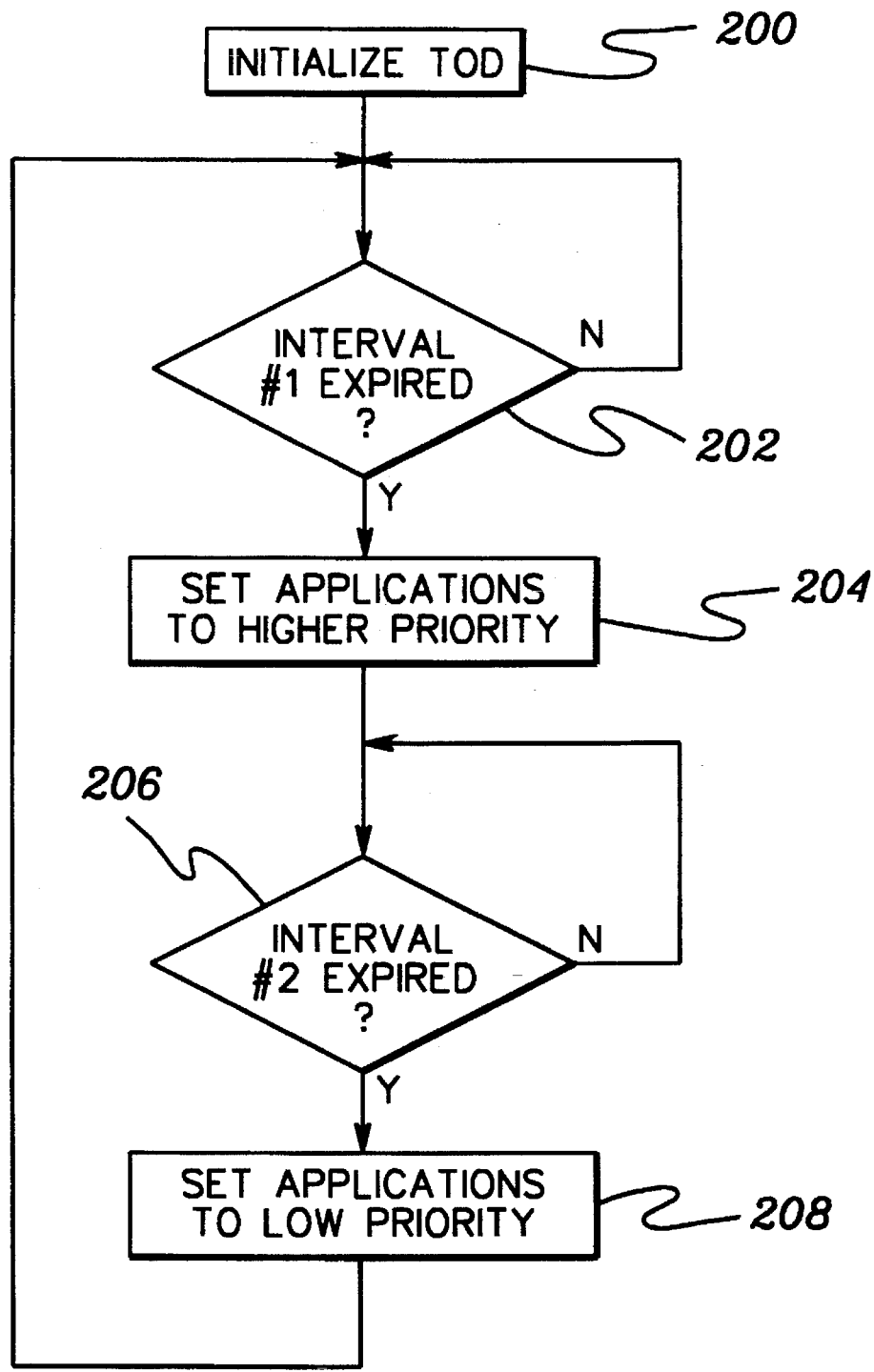
FIG. 2 depicts one embodiment of the logic associated with the resource allocation synchronization technique, in accordance with the principles of the present invention.

One example of a technique for synchronizing allocation of resources in a parallel processing system is described below with reference to FIG. 2. Initially, each of the time of day registers in each of the processors is initialized by a known technique, STEP 200 "INITIALIZE TOD". One technique is described in the Denneau et al. U.S. patent application Ser. No. 08/026,386, entitled "Method and Apparatus for Centralized Determination of Virtual Transmission Delays in Networks of Counter Synchronized Communication Devices" filed on Mar. 4, 1993, which is incorporated herein by reference. In the referenced application, the time of day register is referred to as a nodal time counter.

Subsequent to initializing the time of day registers, a determination is made as to whether a predetermined interval of time has expired, INQUIRY 202 "INTERVAL #1 EXPIRED?". (As described above, the initial time of day value in each of the time of day registers is updated whenever an increment signal is received from oscillator 105.) This predetermined interval of time is the amount of time that the operating system is allowed to run its background jobs, such as memory clean up. (Background jobs are also referred to herein as daemons.) In one example, this interval of time is approximately one-half of a second.

If the interval of time has not expired, flow returns to INQUIRY 202 "INTERVAL #1 EXPIRED?". If, however, the predetermined interval of time has expired, the operating system daemons are put to sleep such that the system resources may be allocated to the user applications. Specifically, the user application running in each processor is given a higher priority than the operating system daemons, so that the system resources within the processor are allocated to the application, STEP 204 "SET APPLICATIONS TO HIGHER PRIORITY". In particular, at the appropriate predefined time intervals, a subroutine, referred to herein as a synchronization daemon, is initiated in each processor. Each synchronization daemon independently raises the priority of the user application running in its associated processor such that system resources are allocated to that user application.

As stated above, the priority values are independently raised, meaning that no communication between the processors is necessary when raising the priority values or allocating the resources. In lieu of communication between the nodes, the synchronized time of day registers are used. At the same initial time and each predefined interval thereafter, the priority value of each user application is raised and resources are allocated to the applications having the raised priority values. This enables the user applications to run without interruption from the operating system daemons for a predetermined amount of time. In one instance, the applications run uninterrupted for approximately 9.5 seconds.

Subsequent to setting the user applications to a higher priority, a determination is made as to whether the predetermined amount of time in which the user applications run uninterrupted has expired, INQUIRY 206 "INTERVAL #2 EXPIRED?". If the predetermined amount of time has not expired, then the applications maintain a higher priority and continue to receive the resources and execute. If, however, the predetermined amount of time has elapsed, then the synchronization daemons are initialized once again. This time, the synchronization daemon lowers the priority of each user application running in its processor, STEP 208 "SET APPLICATIONS TO A LOWER PRIORITY".

Similar to using each synchronization daemon to independently raise the priority value, each synchronization daemon independently lowers the priority values. In particular, the synchronization daemon initiated on a particular processor lowers the priority value of the user application executing on that processor. All of the priority values are lowered at the same time. However, this is done independently, i.e., without any communication between the processors. It is accomplished by using the time of day registers located on the processors.

When the applications are at a lower priority, the resources are allocated to any operating system daemons which need them. Thus, housekeeping can take place. Of course, should the lower priority application be the highest priority job running on the system at any given time, then the application will continue to run.

As described herein, the resource allocation synchronization technique is applied to each processor within the parallel processing system. Each processor has the same time of day data. Therefore, each user application running in the system is given a higher priority at the same time and thus, the allocation of resources to the user applications is synchronized. The resource allocation technique of the present invention causes only a linear degradation in net performance due to system overhead. In one example, this degradation is 5%. This would be the same degradation in a single processor. Therefore, system performance is enhanced in a multi-processor environment.

The above described resource allocation synchronization procedure is discussed in relation to applications executing in a parallel processing system. The technique, however, is also applicable to any scenario in which one component or job needs to be given a higher priority such that it can receive the resources needed to perform. In further examples, the synchronization technique may be applied to input/output devices or communication channels. These are only a couple of examples. Many others exist, and are incorporated within the spirit of this invention, as claimed herein.

Although a preferred embodiment has been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for synchronizing allocation of resources in a parallel processing system having a plurality of processors each having its own independent operating system, and each lacking information on scheduling and workload within the other processors of the plurality of processors, at least two processors of said plurality of processors executing a user application, said user application having a priority value, said method comprising the steps of:

(a) at predefined time intervals, raising said priority value for a predetermined amount of time such that said user application simultaneously receives priority at said at least two processors over processing of said at least two processors' operating systems, said raising step being independently performed at said predefined time intervals by each processor of said at least two processors executing the user application; and (b) responsive to said step (a), and independently within each processor of the at least two processors, allocating resources to said user application having the raised priority value over processing of the processor's operating system wherein said allocating of resources is responsive to said step (a) and thereby synchronized for the user application executing within the at least two processors of said plurality of processors notwithstanding that each processor of said at least two processors has an independent operating system and lacks information on scheduling and workload of the other processors of said at least two processors.

2. The method of claim 1, wherein each of said plurality of processors comprises a time of day register and further comprising determining said predefined time intervals for each of said plurality of processors using each of said time of day registers.

3. The method of claim 2, further comprising:

initializing each of said time of day registers with a same value; and subsequent to said initializing, updating each of said time of day registers using a single clock source.

4. The method of claim 1, further comprising the step of decreasing each priority value having a raised value when said predetermined amount of time has elapsed such that said at least two processors return to processing of their respective operating systems.

5. The method of claim 1, wherein each of said plurality of processors executes an operating system service, and said method further comprises reallocating resources within each of said at least two processors to the operating system service executing thereon when said predetermined amount of time has elapsed.

6. The method of claim 1, wherein said raising step (a) is performed within each processor of the at least two processors by a synchronization daemon process.

7. The method of claim 4, wherein said decreasing step is performed within each processor of the at least two processors by a synchronization daemon process.

8. A method for synchronizing allocation of resources in a parallel processing system having a plurality of processors each having its own independent operating system, and each lacking information on scheduling and workload within the other processors of the plurality of processors, at least two of said processors executing at least one user application, said method comprising the steps of:

at predefined time intervals, simultaneously allocating for a predetermined amount of time resources from processing of said at least two processors' operating systems to said at least one user application, said allocating being performed independently by each processor of said at least two processors executing said at least one user application, wherein allocating of said resources for said predetermined amount of time is synchronized for the at least one user application executing within the at least two processors; and executing said at least one user application.

9. The method of claim 8, wherein each user application has a priority value, and wherein said allocating step further comprises raising each of said priority values such that said at least one user application receives priority at said at least two processors over processing of said at least two processors' operating systems.

10. The method of claim 8, wherein each of said plurality of processors comprises a time of day register, and further comprising determining said predefined time intervals for each of said plurality of processors using each of said time of day registers.

11. A system for synchronizing allocation of resources in a parallel processing system having a plurality of processors each having its own independent operating system, and each lacking information on scheduling and workload within the other processors of the plurality of processors, at least two of said plurality of processors executing a user application, said user application having a priority value, said system comprising:

means for raising at predefined time intervals said priority value for a predetermined amount of time such that the user application simultaneously receives priority at the at least two processors over processing of the at least two processors' operating systems, said priority values being raised independently by each processor of said at least two processors executing the user application; and means for allocating resources within the at least two processors to the user application having the raised priority value over the processing of the at least two processors' operating systems, wherein allocating of resources is synchronized for the user application executing within the at least two processors of said plurality of processors notwithstanding that each processor of said at least two processors has an independent operating system and lacks information on scheduling and workload of the other processors of said at least two processors.

12. The system of claim 11, wherein each of said plurality of processors comprises a time of day register, and further comprising means for determining said predefined time intervals for each of said plurality of processors using each of said time of day registers.

13. The system of claim 12, further comprising:

means for initializing each of said time of day registers with a same value; and a single clock source for updating after initializing each of said time of day registers.

14. The system of claim 11, further comprising means for decreasing said priority value having a raised value when said predetermined amount of time has elapsed such that the at least two processors return to processing of their respective operating systems.

15. The system of claim 11, wherein each of said plurality of processors executes an operating system service, and said at least two processors further comprise means for reallocating resources within each of said at least two processors to the operating system service executing thereon when said predetermined amount of time has elapsed.

16. The system of claim 11, wherein said means for raising comprises a synchronization daemon routine within each processor of the at least two processors.

17. The system of claim 14, wherein said means for decreasing comprises a synchronization daemon routine within each processor of the at least two processors.

18. A system for synchronizing allocation of resources in a parallel processing system having a plurality of processors each having its own independent operating system processing, and each lacking information on scheduling and workload within the other processors of said plurality of processors, at least two of said processors executing at least one user application, said system comprising:

means for simultaneously allocating, at predefined time intervals and for a predetermined amount of time, resources from processing of said at least two processors' operating systems to said at least one user application, said resources being allocated independently by each processor of said at least two processors executing said at least one user application, wherein allocating of said resources for said predetermined amount of time is synchronized for the at least one user application executing within the at least two processors; and means for executing said at least one user application.

19. The system of claim 18, wherein each user application has a priority value, and wherein said allocating means further comprises means for raising each of said priority values such that said at least one user application receives priority at said at least two processors over processing of said at least two processors' operating systems.

20. The system of claim 18, wherein each of said plurality of processors comprises a time of day register, and further comprising means for determining said predefined time intervals for each of said plurality of processors using each of said time of day registers.

* * * * *